US009674101B2

(12) United States Patent
Takahashi

(10) Patent No.: US 9,674,101 B2
(45) Date of Patent: Jun. 6, 2017

(54) COMMUNICATION DEVICE, TRANSMISSION DATA OUTPUT CONTROL METHOD, AND PROGRAM FOR SAME

(71) Applicant: NEC Corporation, Tokyo (JP)

(72) Inventor: Eiji Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 42 days.

(21) Appl. No.: 14/440,003

(22) PCT Filed: Nov. 1, 2013

(86) PCT No.: PCT/JP2013/079785
§ 371 (c)(1),
(2) Date: Apr. 30, 2015

(87) PCT Pub. No.: WO2014/069642
PCT Pub. Date: May 8, 2014

(65) Prior Publication Data
US 2015/0304226 A1     Oct. 22, 2015

(30) Foreign Application Priority Data

Nov. 5, 2012 (JP) .................................. 2012-243363

(51) Int. Cl.
*H04L 12/26* (2006.01)
*H04L 12/823* (2013.01)
(Continued)

(52) U.S. Cl.
CPC .............. *H04L 47/32* (2013.01); *H04L 47/12* (2013.01); *H04L 47/22* (2013.01); *H04L 47/25* (2013.01);
(Continued)

(58) Field of Classification Search
CPC ....................................................... H04L 47/10
See application file for complete search history.

(56) References Cited

U.S. PATENT DOCUMENTS

2002/0075895 A1*   6/2002   Yamaguchi ........... H04J 3/1682
                                                                 370/465
2005/0083850 A1    4/2005   Sin et al.
(Continued)

FOREIGN PATENT DOCUMENTS

CA    2749826 A1    7/2010
EP    1524808 A2    4/2005
(Continued)

OTHER PUBLICATIONS

International Search Report corresponding to PCT/JP2013/079785 mailed on Dec. 10, 2013 (one page).
(Continued)

*Primary Examiner* — Chi H Pham
*Assistant Examiner* — Fahmida Chowdhury
(74) *Attorney, Agent, or Firm* — Wilmer Cutler Pickering Hale and Dorr LLP

(57) ABSTRACT

A communication device and the like are provided in which a throughput during a congestion avoidance operation in a communication session can be improved by considering a congestion state of a network.
A communication device 1 for controlling a data amount to be continuously transmitted to a network 10 is configured so as to determine a transmission rate control mode using RTT (Round Trip Time) as a reference, determine an upper limit value of a transmission rate according to the transmission rate control mode, and control to keep continuously transmitting data in a range not exceeding the upper limit value of the transmission rate.

14 Claims, 3 Drawing Sheets

(51) Int. Cl.
*H04L 12/815* (2013.01)
*H04L 12/825* (2013.01)
*H04L 29/06* (2006.01)
*H04L 12/801* (2013.01)
*H04L 12/807* (2013.01)
*H04L 12/841* (2013.01)

(52) U.S. Cl.
CPC ............ *H04L 69/163* (2013.01); *H04L 47/14* (2013.01); *H04L 47/193* (2013.01); *H04L 47/27* (2013.01); *H04L 47/28* (2013.01)

(56) References Cited

U.S. PATENT DOCUMENTS

| | | | |
|---|---|---|---|
| 2005/0286416 A1* | 12/2005 | Shimonishi | H04L 1/1671 370/229 |
| 2006/0218264 A1 | 9/2006 | Ogawa et al. | |
| 2008/0212480 A1 | 9/2008 | Shimonishi | |
| 2012/0063493 A1 | 3/2012 | Hasegawa et al. | |
| 2012/0230190 A1 | 9/2012 | Suzuki | |
| 2013/0083654 A1* | 4/2013 | Lee | H04L 47/283 370/230 |
| 2014/0241163 A1* | 8/2014 | Lee | H04W 48/16 370/235 |

FOREIGN PATENT DOCUMENTS

| | | |
|---|---|---|
| EP | 1708438 A1 | 10/2006 |
| JP | 2001-160824 A | 6/2001 |
| JP | 2003-318979 A | 11/2003 |
| JP | 2004-080413 A | 3/2004 |
| JP | 2005-136548 A | 5/2005 |
| JP | 2006-217234 A | 8/2006 |
| JP | 2008-193335 A | 8/2008 |
| JP | 2011-035700 A | 2/2011 |
| JP | 2012-515491 A | 7/2012 |
| WO | WO-2010/082091 A2 | 7/2010 |

OTHER PUBLICATIONS

W. Stevens, "TCP Slow Start, Congestion Avoidance, Fast Retransmit, and Fast Recovery Algorithms," IETF RFC2001, http://www.ietf.org/rfc/rfc2001.txt, Jan. 1997 (6 pages).

Extended European Search Report issued by the European Patent Office for Application No. 13850413.9 dated Jun. 1, 2016 (8 pages).

* cited by examiner

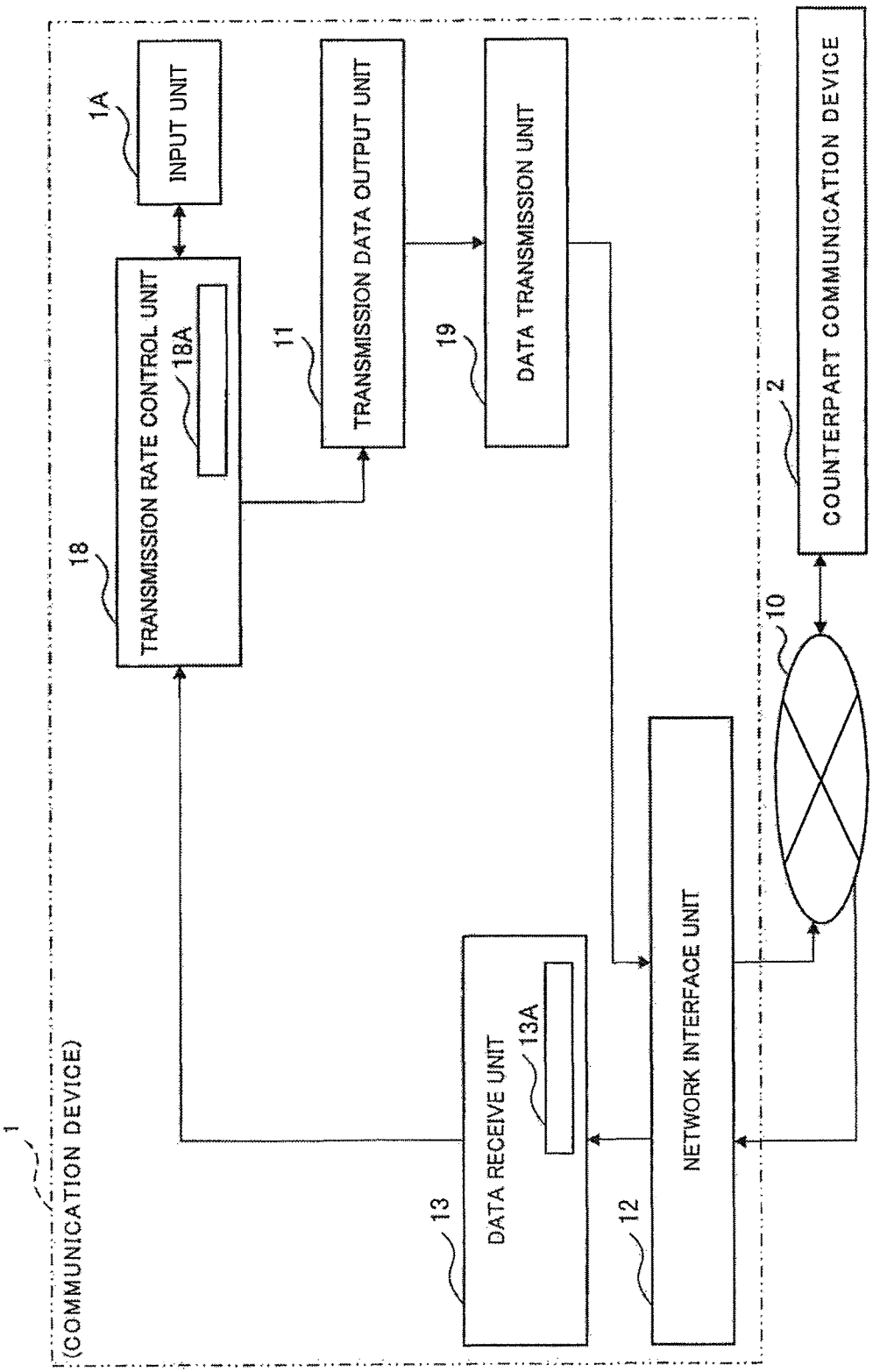

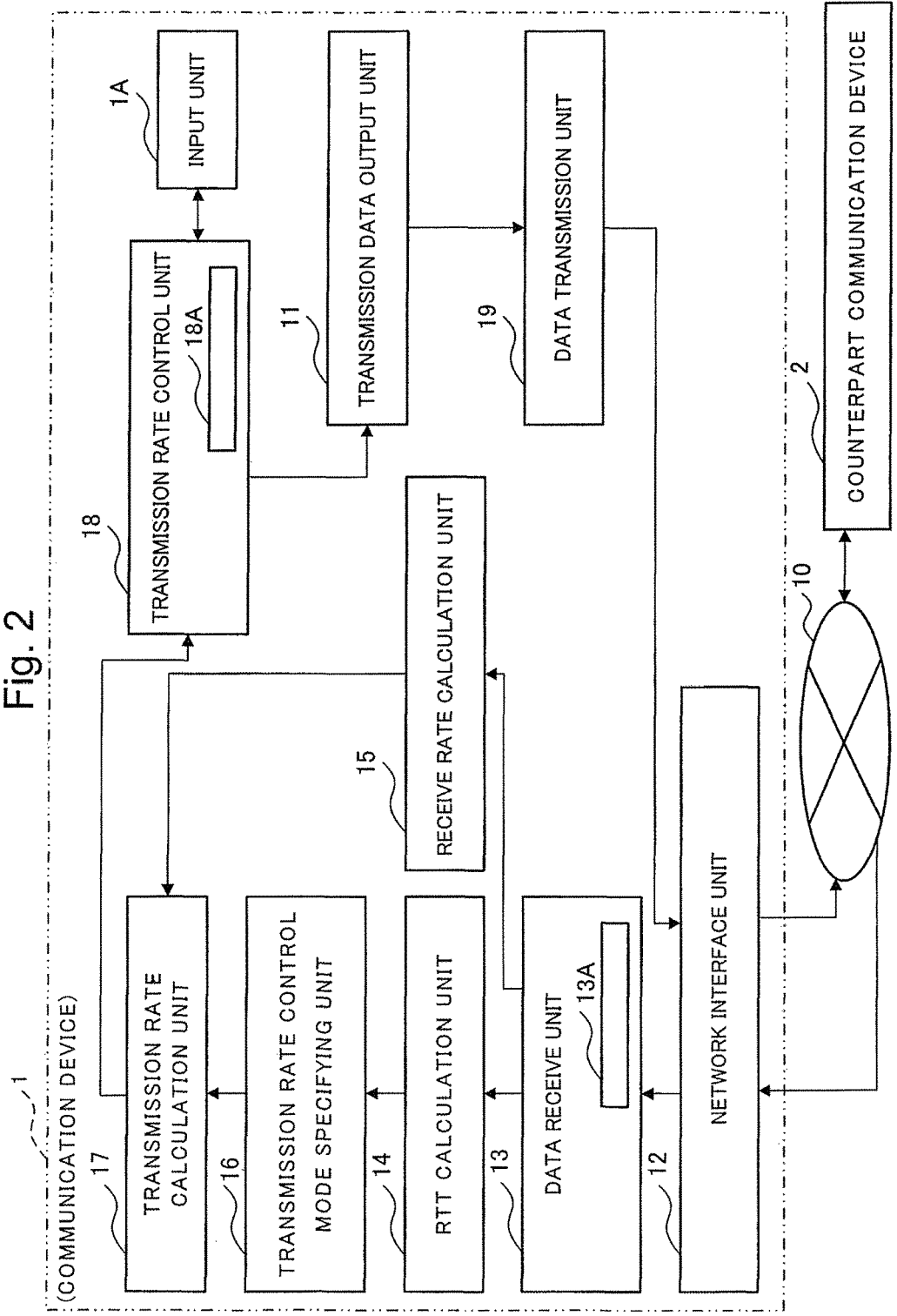

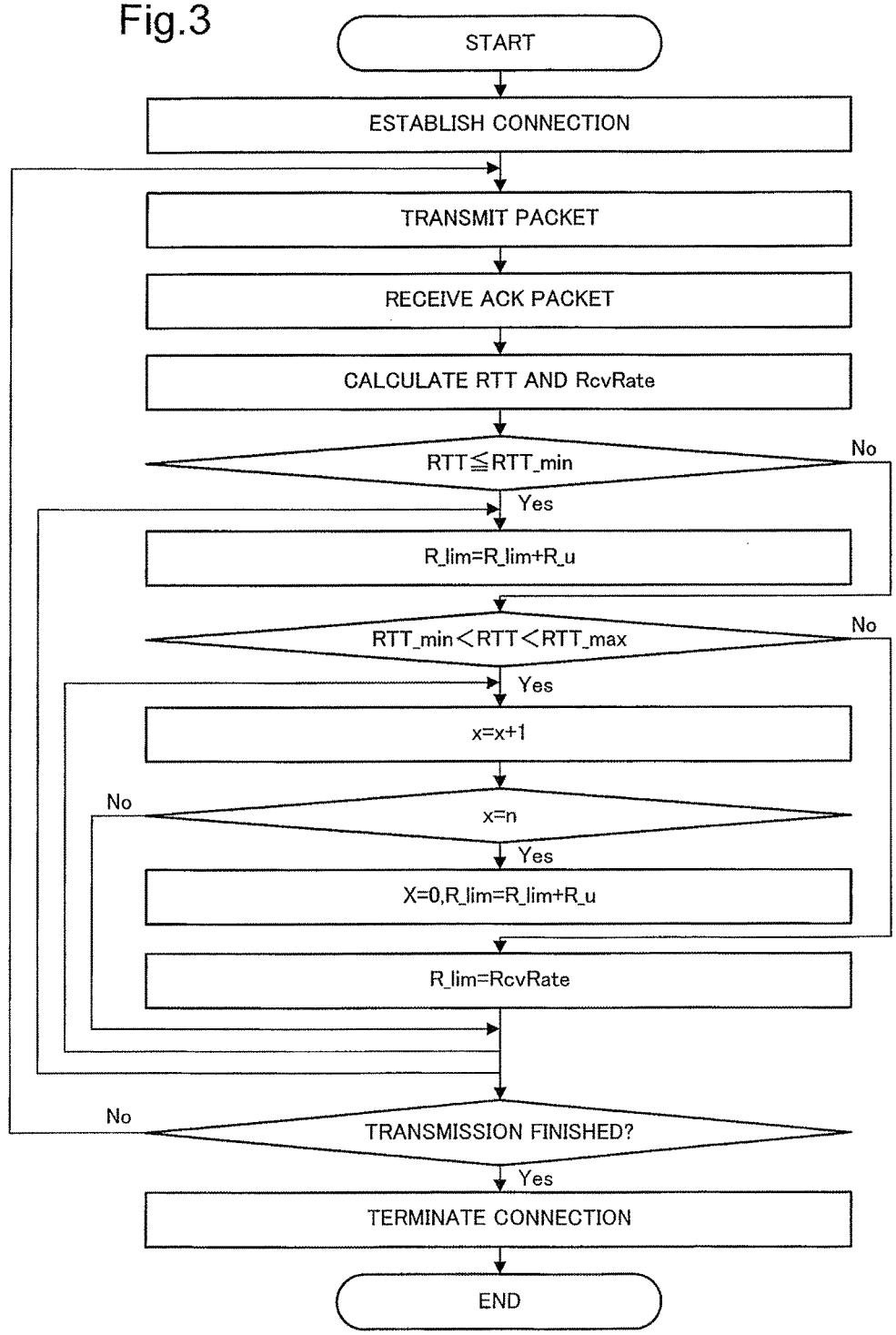

ns/ COMMUNICATION DEVICE, TRANSMISSION DATA OUTPUT CONTROL METHOD, AND PROGRAM FOR SAME

CROSS-REFERENCE TO RELATED APPLICATIONS

This application is a national stage application of International Application No. PCT/JP2013/079785 entitled "Communication Device, Transmission Data Output Control Method, and Program for Same," filed on Nov. 1, 2013, which claims the benefit of the priority of Japanese Patent Application No. 2012-243363, filed on Nov. 5, 2012, the disclosures of each of which are hereby incorporated by reference in their entirety.

TECHNICAL FIELD

The present invention relates to a communication device or the like for performing a communication session via a network and, in particular, relates to a communication device, a transmission data output control method, and a program for same which use a communication protocol having a congestion control function such as TCP (Transmission Control Protocol).

BACKGROUND ART

Currently, in communication using TCP (Transmission Control Protocol) which is widely used as a communication protocol for safely and accurately transmitting a large amount of data via the Internet, a window control is used in order to perform efficient data transfer.

In the window control, first of all, a data receive side notifies a receive buffer size (RWIN, Receive Window) to a data transmission side. The data transmission side may transmit an amount of data of the receive buffer size (RWIN) without waiting for an acknowledgement (ACK) of the receive side.

In this case, when RWIN is too small compared to a line speed, a throughput is decreased due to deterioration of data transfer efficiency. Furthermore, when RWIN is too large compared to the line speed, the throughput is decreased since it takes time for retransmission processing due to data loss.

TCP which is the above communication protocol includes a congestion control function for appropriately adjusting a congestion window (CWND, Congestion Window) according to a congestion condition of a network. The congestion control function of the TCP includes a function which always checks a communication state and configures to increase a transmission band by increasing the congestion window when congestion does not exist in the network and to decrease the transmission band by decreasing the congestion window when congestion exists in the network.

As an example of TCP versions employing such a congestion control function, there is TCP-Reno (NPL 1). In the TCP-Reno, when an occurrence of a packet discard is detected in a congestion avoidance operation, it is determined that the network is in a congestion state and the congestion window is reduced to a half of the current one and, thereby, the transmission band is decreased.

On the other hand, when an occurrence of a packet discard is not detected, it is determined that the network is not in the congestion state and the transmission band is slowly increased by linearly increasing the congestion window by 1 MMS (Maximum Segment Size).

Incidentally, TCP-Reno has a problem that an originally-expected throughput cannot be obtained subsequently until the window size is increased to a sufficient size since it once halves the size of the congestion window when a packet discard occurs.

This is a serious problem especially for wireless lines or the like in which a packet discard may occur due to causes other than congestion. In other words, despite a packet discard not caused by congestion, the TCP throughput is unnecessarily decreased.

Furthermore, since TCP-Reno does not transmit next data until ACK is returned as an acknowledgement after transmitting an amount of data of the window size, the TCP throughput is unnecessarily decreased when RTT (Round Trip Time) as a transmission data response time becomes large.

For example, in wireless lines to which communication methods such as WiMAX (Worldwide Interoperability for Microwave Access), HSPA (High Speed Packet Access), LTE (Long Term Evolution) are applied, errors may occur in a wireless link layer between a mobile terminal and a base station. Thus, when a packet discard occurs due to a cause other than congestion, the TCP throughput is unnecessarily decreased.

On the other hand, as a technical method for recovering the errors, an automatic repeat request (ARQ: Automatic Repeat Request) for automatically retransmitting in the wireless link layer between the mobile terminal and the base station may be used. In this case, although it is possible to prevent a packet discard, an increase of RTT not caused by congestion in response to a time required for the automatic repeat request occurs and at the same time the TCP throughput is unnecessarily decreased.

A technology described in PTL 1 has been known as a related technology which provides some information from the network to the terminal whether or not the packet discards are caused by congestion when the packet discards occur (a first related technology).

In other words, PTL 1 in which the first related technology is described discloses a technology in which, when a packet discard due to an error of the line occurs, ELN (Explicit Loss Notification) information is transmitted from a receive terminal to a transmission terminal and the transmission terminal does not unnecessarily decrease the congestion window when the packet discard is not due to congestion.

In addition, a technology described in PTL 2 has been known as a related technology which performs a congestion determination using information a TCP transmission terminal has and takes a corresponding measure instead of immediately determining that the packet discard occurrence described above is a congestion occurrence (a second related technology).

In other words, PTL 2 in which the second related technology is described discloses a technology in which the congestion window is not decreased even when a packet discard is detected, by first measuring RTT of the line and determining that there is no congestion when the RTT is equal to or less than a certain value.

Furthermore, as a third related technology, for example, PTL 3 discloses a technology in which a communication device for performing a communication session based on a congestion window estimates a utilization rate of a bottleneck line from RTT in the communication session, determines an increment of the congestion window in a congestion avoidance operation based on the estimated line utilization rate, and determines a size of the congestion window to be applied based on said increment when the congestion window is increased.

In addition, PTL 4, in which a fourth related technology is described, discloses a technology in which a retransmission packet is transmitted to more reliably reach to a receiver by properly controlling a transmission rate.

Furthermore, PTL 5, in which a fifth related technology is described, discloses a transmission technology which realizes an effective rate control in consideration of characteristics of a wireless environment by performing a rate control based on network information in the wireless environment.

CITATION LIST

Patent Literature

PTL 1: Japanese Laid-open Patent Publication No. 2004-080413
PTL 2: Japanese Laid-open Patent Publication No. 2001-160824
PTL 3: Japanese Laid-open Patent Publication No. 2006-217234
PTL 4: Japanese Laid-open Patent Publication No. 2005-136548
PTL 5 Japanese Laid-open Patent Publication No. 2003-318979

Non Patent Literature

NPL 1: W. Stevens, "TCP Slow Start, Congestion Avoidance, Fast Retransmit, and Fast Recovery Algorithms," IETF RFC2001, http://www.ietf.org/rfc/rfc2001.txt, January 1997. [Searched Aug. 30, 2012]

Technical Problem

A problem of the first related technology described above is that its installation is difficult since it is necessary to provide in a network a mechanism to notify a state of a wireless line and a cause of a packet discard to a terminal.

In particular, when a terminal connected to a wireless line and unspecified number of terminals not connected to the wireless line performs communication, it is not easy to install said mechanisms to all of the unspecified number of terminals of the latter. Furthermore, it is difficult to apply similar mechanisms to wired lines.

A problem of the second related technology is that congestion determination based on RTT as the response time described above is uncertain. Since a range of values RTT can take depends on a buffer capacity of a router, it is difficult to uniquely determine the optimal RTT threshold value used for the congestion determination.

In other words, since the larger the buffer capacity of the router is, the larger the range of values RTT can take becomes, it is easily determined as a congestion occurrence when a line of a router with a relatively small buffer capacity is used rather than a line of a router with a relatively large buffer capacity even if one RTT threshold value is set in a terminal.

Then, it may be determined as a congestion occurrence in spite of being actually minor congestion and as a result, the throughput is decreased by unnecessary reduction control of the congestion window. Conversely, when the buffer capacity is relatively large, it may be determined that congestion has not occurred yet for a state to be determined as a congestion occurrence, where, a problem occurs that a congestion window to be reduced is not reduced and as a result, congestion cannot be avoided. Furthermore, even if the congestion window could be appropriately controlled, the TCP throughput is unnecessarily decreased due to an increase of RTT not caused by congestion.

Furthermore, a problem of the third related technology is uncertainty of the estimation of the bottleneck line utilization rate based on RTT. Although the increment of the congestion window in the congestion avoidance operation is determined based on the estimated line utilization rate, the estimated value may include an error since it is not a method of reliably obtaining the line utilization rate. As a result, the throughput is decreased due to an unnecessary reduction control of the congestion window or, conversely, the congestion window to be reduced is not reduced, which, as a result, causes a problem that congestion cannot be avoided.

In addition, since a rate of decrease and a rate of increase of a packet communication rate are determined according to a rate of increase and a rate of decrease of RTT in the fourth related technology, there is a disadvantage that a transceiver circuit capable of always and quickly responding to a wide range of fluctuation of RTT has to be provided and there is a disadvantage that the device becomes large.

In addition, while the fifth related technology discloses that a rate control is performed in consideration of network information obtained at relay nodes, there is no specific disclosure about contents of the rate control, in particular, about modes. Furthermore, there is no any specific disclosure about technical contents related to the congestion avoidance operation other than avoidance of packet loss.

OBJECT OF INVENTION

The present invention has been made in view of the above problems and an object thereof is to provide a communication device, a transmission data output control method, and a program thereof which are capable of improving a throughput during a congestion avoidance operation in a communication session in consideration of a congestion state of a network.

Solution to Problem

In order to achieve the object described above, the communication device according to the present invention comprises: a transmission data output unit for outputting a predetermined amount of communication data toward a communication destination via a network; and a transmission rate control unit for controlling a data amount continuously transmittable to the network by drive-controlling the transmission data output unit, wherein the transmission rate control unit comprises a transmission rate control function for controlling so as to keep continuously transmitting the transmission data in a range not exceeding an upper limit value of a specified transmission rate determined in advance.

In order to achieve the object described above, according to the present invention, in the transmission data output control method for a communication device comprising: a transmission data output unit for outputting a predetermined amount of communication data toward a communication destination via a network; and a transmission rate control unit for controlling a data amount continuously transmittable to the network by drive-controlling the transmission data output unit, wherein a transmission rate control mode specifying unit provided in advance specifies a transmission rate control mode required for transmitting the data based on congestion information obtained from the network, a transmission rate calculation unit provided in advance determines an upper limit value of a transmission rate according to the specified transmission rate control mode, and the transmission rate control unit drive-controls the transmission data output unit so as to keep continuously transmitting the transmission data in a range not exceeding the determined upper limit value of the specified transmission rate.

In order to achieve the object described above, according to the present invention, in the transmission data output control program for a communication device comprising: a transmission data output unit for outputting a predetermined amount of communication data toward a communication destination via a network; and a transmission rate control unit for controlling a data amount continuously transmittable to the network by drive-controlling the transmission data output unit, wherein a computer is caused to realize functions provided, the functions comprising: a rate control mode specifying function for specifying a transmission rate control mode based on congestion information of the network; a transmission rate upper limit value determination function for determining an upper limit value of a transmission rate according to the specified transmission rate control mode; and an output unit drive-control function for drive-controlling the transmission data output unit so as to keep continuously transmitting the transmission data in a range not exceeding the determined upper limit value of the specified transmission rate.

Advantageous Effects of Invention

The present invention is configured as described above and accordingly a communication device, a transmission data output control method, and a program thereof can be provided which are capable of transmitting data at a transmission rate suitable for a situation at the current time even if a communication line is, for example, a bottleneck line, thereby avoiding congestion, while a band of the bottleneck line being effectively utilized, even in a communication environment in which random packet discards and packet error recovery delays occur, and improving a throughput during a congestion avoidance operation in a communication session.

BRIEF DESCRIPTION OF DRAWINGS

FIG. 1 is a block diagram illustrating a basic configuration of a communication device according to an exemplary embodiment of the present invention.

FIG. 2 is a block diagram illustrating an entire configuration of the communication device according to the exemplary embodiment of the present invention.

FIG. 3 is a flowchart illustrating an operational procedure of the communication device according to the exemplary embodiment of the present invention.

DESCRIPTION OF EMBODIMENTS

In the following, exemplary embodiments of the present invention will be described with reference to the drawings.
[Basic Contents]

First, basic contents of a communication device according to the present invention will be described based on FIG. 1.

In FIG. 1, a communication device 1 includes a transmission data output unit 11 for outputting a predetermined amount of communication data toward a counterpart communication device 2 which is a communication destination via a network 10 and a transmission rate control unit 18 for controlling a data amount continuously transmittable to the network 10 by drive-controlling the transmission data output unit 11.

In addition, the transmission rate control unit 18 described above includes a transmission rate control function 18A for controlling so as to keep continuously transmitting the transmission data in a range not exceeding an upper limit value of a specified transmission rate determined in advance.

Here, a reference numeral 12 denotes a network interface unit for transmitting to and receiving from the network 10 described above. Further, a reference numeral 13 denotes a data receive unit for receiving transmission information from the counterpart communication device 2 via the network 10 and a reference numeral 19 denotes a data transmission unit for transmitting predetermined transmission data to the counterpart communication device 2 via the network 10.

Then, in an actual data transmission, the transmission data output unit 11 is operated by being drive-controlled by the transmission data output unit 11 and outputs a predetermined amount of communication data toward the counterpart communication device 2 which is a communication destination via the network 10. In this case, the transmission data output unit 11 is controlled so as to keep continuously transmitting the transmission data within a framework of the predetermined specific transmission rate as described above and in a range not exceeding its upper limit value.

Therefore, according to the present exemplary embodiment, it is possible to transmit data at a transmission rate suitable for a situation at the current time even if a communication line is, for example, a bottleneck line, and thereby to avoid congestion, while a band of the bottleneck line being effectively utilized, even in a communication environment in which random packet discards and packet error recovery delays occur.

[Specific Implementation Contents]

Hereinafter, the present exemplary embodiment will be described in more detail based on FIG. 2 and FIG. 3 including the basic contents of FIG. 1 described above.

In FIG. 2, the communication device 1 according to the present exemplary embodiment includes: a network interface unit 12 for transmitting and receiving predetermined data to and from the counterpart communication device 2 via the network 10; a data receive unit 13 for receiving transmission data transmitted from the counterpart communication device 2; an RTT calculation unit 14 for calculating RTT (Round Trip Time) as a transmission data response time as required; and a receive rate calculation unit 15 for calculating a receive rate of a receive side.

Furthermore, the communication device 1 includes: a transmission rate control mode specifying unit 16 for specifying a transmission rate control mode using a value (congestion information of a network) of RTT calculated by the RTT calculation unit 14 described above as a reference; a transmission rate calculation unit 17 for determining an upper limit value of a transmission rate according to the specified transmission rate control mode; a transmission rate control unit 18 for controlling an output operation of the transmission data output unit 11 provided in advance; and a data transmission unit 19 for outputting, toward the other side communication unit 2 described above, transmission data outputted from the transmission data output unit 11 by being controlled by the transmission rate control unit 18.

Here, the transmission rate control unit 18 is provided with the transmission rate control mode specifying unit 16 and the transmission rate calculation unit 17 described above and it is configured such that the transmission rate control unit 18 controls an output operation of the transmission data output unit 11 based on respective output information of the transmission rate control mode specifying unit 16 and the transmission rate calculation unit 17.

The network interface unit 12 includes a function that, when a packet is received from the network 10, the packet is transmitted to the data receive unit 13. Furthermore, it includes a function that, when a packet for transmission is received from the data transmission unit 19, the packet is transmitted to the network 10.

The data receive unit 13 described above includes a function that, when a packet is received from the network interface unit 12, the packet is transmitted to each of the RTT calculation unit 14 and the receive rate calculation unit 15.

Further, the RTT calculation unit 14 includes a function of calculating RTT as a transmission data response time by analyzing the packet received from the data receive unit 13. For example, RTT can be calculated in a similar way as for TCP.

In other words, when Timestamp Option is available, RTT may be set to "(the current time)—(Timestamp Echo)" upon receiving ACK which is a positive response signal.

On the other hand, when Timestamp Option is not available, RTT may be set to "(the current time)—(time when the packet responded by ACK has been transmitted)" upon receiving ACK.

The receive rate calculation unit 15 includes a function of calculating a receive rate of a receive side by analyzing a packet received from the data receive unit 13.

For example, acknowledgement numbers described in i-th ACK received at a time t_i and i+k-th ACK received at a time t_i+k are set respectively to RcvBytes_i and RcvBytes_i+k.

At this time, a receive rate RcvRate of the receive side during time t_i to time t_i+k may be approximately set to RcvRate=(RcvBytes_i+k−RcvBytes_i)/(t_i+k−t_i).

Where, a parameter k is an arbitrary natural number which is set in advance. Further, the receive rate may be a moving average of values of RcvRate in the past in order to remove errors.

The transmission rate control mode specifying unit 16 includes a function of specifying as any one of the following control modes using a value of RTT calculated by the RTT calculation unit 14 as a reference. Here, in the present exemplary embodiment, three modes of a rate surge mode, a rate adjustment mode, and a rate suppression mode are set in advance as the transmission rate control modes.

Here, the rate surge mode is a mode in which the transmission rate is rapidly increased assuming that the bottleneck line band is not fully utilized.

Besides, the rate adjustment mode is a mode in which the transmission rate is gradually increased assuming the bottleneck line band is almost fully utilized.

Further, the rate suppression mode is a mode in which the transmission rate is suppressed assuming that the bottleneck line band is exceeded in transmission.

Then, the transmission rate control mode specifying unit 16 sets the minimum RTT to RTT_min and the maximum RTT to RTT_max and specifies the transmission rate control mode to the rate surge mode when the communication line is "RTT≤RTT_min".

In other words, the transmission rate control mode specifying unit 16 includes a function of specifying said transmission rate control mode to the rate surge mode for rapidly increasing the transmission rate when the signal propagation time RTT at the current time becomes equal to or less than the minimum value (RTT_min) of signal propagation times in the past.

Furthermore, the transmission rate control mode specifying unit 16 specifies the transmission rate control mode to the rate adjustment mode when the communication line is "RTT_min<RTT<RTT_max".

In other words, the transmission rate control mode specifying unit 16 includes a function of specifying said transmission rate control mode to the rate adjustment mode for gradually increasing the transmission rate when the signal propagation time RTT at the current time is greater than the minimum value (RTT_min) and less than the maximum value (RTT_max) of signal propagation times in the past.

In addition, the transmission rate control mode specifying unit 16 specifies the transmission rate control mode to the rate suppression mode when the communication line is "RTT_max≤RTT".

In other words, the transmission rate control mode specifying unit 16 includes a function of specifying the transmission rate control mode to the rate suppression mode for suppressing the transmission rate when the signal propagation time RTT at the current time is equal to or greater than the maximum value (RTT_max) of signal propagation times in the past.

Here, RTT_min and RTT_max are determined, for example, as follows. RTT_min is a value suggesting that congestion has not occurred at that time and is set to the minimum RTT among RTT values in the past.

And, RTT_max is a value suggesting that congestion has occurred at that time and is set to an RTT value immediately before detection of a packet discard, an RTT value immediately before detection of continuous packets, or an average value of RTT values in the vicinity thereof.

Thus, in the present exemplary embodiment, the transmission rate control mode specifying unit 16 described above includes a control mode specifying function for specifying respectively to the rate surge mode, the rate adjustment mode, and the rate suppression mode, which are the transmission rate control modes described above, corresponding to each case that the signal propagation time (communication time) in the network 10 is short, normal, or long.

Further, the transmission rate calculation unit 17 described above includes a function for determining the upper limit value of the transmission rate according to the transmission rate control mode specified by the transmission rate control mode specifying unit 16.

When the transmission rate control mode is the rate surge mode, the upper limit value of the transmission rate is calculated according to "R_lim=R_lim+R_u". Where, R_u is a unit rate determined in advance.

Further, when the transmission rate control mode is the rate adjustment mode, the upper limit value of the transmission rate is calculated according to "R_lim=R_lim+R_u" every time the rate adjustment mode consecutively continues by n times. In cases other than that, it is calculated according to "R_lim=R_lim".

Where, the parameter n is an arbitrary natural number set in advance. In addition, for example, when a band upper limit value B_max of a specification of the bottleneck line is known, it may be calculated according to "R_lim=(1−α)× R_lim+α×B_max". Where, the parameter α is a real number in a range of 0<α<1 set in advance.

Furthermore, when the transmission rate control mode is the rate suppression mode, the upper limit value of the transmission rate is calculated according to "R_lim=RcvRate". Where, RcvRate is a receive rate of a receive side calculated by the receive rate calculation unit 15.

Further, the transmission rate control unit 18 described above includes a function of transmitting data with R_lim as the upper limit which is the upper limit value of the transmission rate calculated by the transmission rate calculation unit 17. At that time, a flow control based on a congestion window (CWND, Congestion Window) of TCP is not performed and data continues to be transmitted at the maximum transmission rate with R_lim as the upper limit as long as a receive buffer size (RWIN, Receive Window) of the receive side does not become zero.

In other words, the transmission rate control unit 18 includes a maximum rate transmission control function 18A of continuing a transmission control of data at the maximum transmission rate in a range not exceeding the transmission rate upper limit value as long as a free space of a buffer size of a receive buffer 13A in the data receive unit 13 provided in advance does not become zero.

When it is notified that the receive buffer size of the data receive unit 13 in the receive side by ACK which is a positive response signal is zero, it means that a free space in the receive buffer 13A of the receive side has run out. In this case, transmission is interrupted until a receive buffer size of a value greater than zero is notified from the receive side to the transmission side.

Then, the data transmission unit 19 described above transmits packets with a timing specified by the transmission rate control unit 18.

[Description of Operation]

Next, an operational procedure of the communication device according to the exemplary embodiment described above will be described based on a flowchart of FIG. 3.

First, a main portion of the operational procedure leading to data transmission of the communication device 1 in the exemplary embodiment described above will be described.

First, in the communication device described above including the transmission data output unit 11 for outputting a predetermined amount of communication data toward the communication destination via the network 10 and the transmission rate control unit 18 for controlling a data amount continuously transmittable to the network 10 by drive-controlling the transmission data output unit 11, the transmission rate control mode specifying unit 16 provided in advance, specifies a transmission rate control mode required for transmitting the data based on congestion information obtained from the network 10 described above (a transmission rate control mode specifying step).

Next, the transmission rate calculation unit 15 provided in advance determines an upper limit value of a transmission rate according to a transmission rate control mode specified by the transmission rate control mode specifying unit 16 (a transmission rate upper limit value determination step).

Subsequently, said transmission rate control unit 18 is configured to drive-control said transmission data output unit 11 such that the transmission data continues to be continuously transmitted in a range not exceeding the upper limit value of the specific transmission rate determined by the transmission rate calculation unit 15 (a data output control step).

Then, the object described above is achieved by configuring the operational procedures in the present exemplary embodiment as described above and executing the operational procedures in sequence.

Hereinafter, these will be described in more detail.

First, the communication device 1 (hereinafter, referred to as a "transmission terminal") of the transmission side establishes a TCP connection between its own device 1 which is the transmission terminal and the counterpart communication device 2 (hereinafter, referred to as a "receive terminal") which is the receive side via the Internet 10 (FIG. 3: step S101) and starts transmission of transmission data (FIG. 3: step S102).

When an acknowledgement packet (an ACK packet) is returned from the receive terminal 2 in response to a packet transmitted from the transmission terminal 1, the data receive unit 13 receives it (FIG. 3: step S103). The RTT calculation unit 14 obtains RTT received using the received ACK packet and, at the same time, the receive rate calculation unit 15 calculates a data receive rate RcvRate of the receive terminal 2 (FIG. 3: step S104).

Thereby, a congestion state (i.e. network information to specify a transmission rate control mode required for data transmission) of the network 10 at the current time is first detected by a value of the signal propagation time RTT.

Next, when RTT≤RTT_min, the transmission rate control mode specifying unit 16 determines that the transmission rate control mode is the transmission rate surge mode (FIG. 2: 105/YES).

In other words, in a step of specifying the transmission rate control mode described above, when the signal propagation time RTT in the network 10 at the current time becomes equal to or less than the minimum value (RTT_min) of signal propagation times in the past, said transmission rate control mode specifying unit 16 specifies said transmission rate control mode as the rate surge mode for rapidly increasing said transmission rate.

In response to this result, the transmission rate calculation unit 17 calculates the upper limit value of the transmission rate according to R_lim=R_lim+R_u (FIG. 2: 106).

On the other hand, when RTT_min<RTT<RTT_max, the transmission rate control mode specifying unit 16 determines the transmission rate control mode to be the rate adjustment mode (FIG. 2: 107/YES). In other words, in a step of specifying said transmission rate control mode, when the signal propagation time RTT in said network 10 at the current time is greater than the minimum value (RTT_min) and less than the maximum value (RTT_max) of signal propagation times in the past, said transmission rate control mode specifying unit 16 specifies said transmission rate control mode to the rate adjustment mode for gradually increasing said transmission rate.

Then, in response to this result, the transmission rate calculation unit 17 sets X=X+1 (FIG. 2: 108), sets X=0 when X=n (FIG. 2: 109/YES), and sets the upper limit value of the transmission rate to R_lim=R_lim+R_u (FIG. 2: 110).

In addition, the transmission rate control mode specifying unit 16 determines the transmission rate control mode to be the rate suppression mode when RTT_max≤RTT (FIG. 2: 107/NO). The upper limit value of the transmission rate is set to R_lim=RcvRate (FIG. 2: 111).

In other words, in a step of specifying said transmission rate control mode, when the signal propagation time RTT in said network 10 at the current time becomes equal to or greater than the maximum value (RTT_max) of signal propagation times in the past, said transmission rate control mode specifying unit 16 specifies said transmission rate control mode to the rate suppression mode for suppressing said transmission rate.

Then, the transmission terminal 1 repeats the means described above until data to be transmitted has run out (FIG. 2: 112) and finally disconnects the TCP connection to terminate the communication (FIG. 2: 113).

On the other hand, the transmission rate control unit 18 does not perform a flow control based on the congestion window (CWND, Congestion Window) of TCP and continues to transmit data at the maximum transmission rate with R_lim as the upper limit as long as the buffer size (RWIN, Receive Window) of the receive buffer 13A in the data receive unit 13 of the receive side does not become zero.

In other words, in a step of drive-controlling the transmission data output unit 11 described above, said transmission rate control unit 16 is configured to continue a transmission control of said data at the maximum transmission rate in a range not exceeding the upper limit value of said transmission rate as long as a free space of the buffer size of the receive buffer 13A in the data receive unit 13 provided in advance does not become zero.

On the other hand, when it is notified by ACK that the receive buffer size of the receive side is zero, it means that a free space in the receive buffer 13A of the receive side has run out. In that case, the transmission is interrupted until the receive buffer size of a value greater than zero is notified from the receive side to the transmission side (FIG. 2: 102).

Here, in each operation step (a content execution step) described above, it may be configured such that the execution content is programmed so as to cause a computer provided in said communication device 1 in advance to implement it. The program may be recorded in a non-temporary storage medium, for example, a DVD, a CD, a flash memory or the like. In that case, the present program is retrieved from the storage medium by the computer to be executed.

As described above, according to the present exemplary embodiment, the transmission rate is not unnecessarily decreased even when a packet discard not caused by a congestion occurrence is detected, by measuring RTT and determining a transmission rate using the RTT as a reference.

In addition, by not performing a flow control based on the congestion window of TCP and continuing to transmit data at the maximum transmission rate with R_lim as the upper limit as long as the receive buffer size (RWIN, Receive Window) of the receive side does not become zero, the transmission rate is not unnecessarily decreased even when an increase of RTT not caused by a congestion occurrence due to an automatic retransmission control of a wireless link layer or the like is generated.

Furthermore, by providing the rate adjustment mode in addition to the rate surge mode and the rate suppression mode as the transmission rate control modes, even if an error exists in estimating the RTT reference values (RTT_min and RTT_max), its effects can be made small. In addition, the throughput can be relatively easily improved since a mechanism for notifying special information from a network to a communication device is not required.

As described above, the communication device 1 according to the present exemplary embodiment is configured and functions as described above and, therefore, data can be transmitted at a transmission rate suitable for a situation at the current time even when the communication line is, for example, a bottleneck line based on a utilization rate of the bottleneck line estimated using RTT (Round Trip Time) which is a transmission data response time and, accordingly, congestion can be avoided, while a band of the bottleneck line being effectively utilized, even in a communication environment in which random packet discards and packet error recovery delays may occur.

With regards to an applicable scope of the present invention, the present invention may be applied, for example, to a relay device for relaying a session between the communication device 1 and the communication device 2 connected via a network. The relay device is to relay a communication session between the two terminals by once terminating a communication session with the communication device 1 of one side and then establishing a new communication session with the communication device 2 of the other side in the communication session between the two communication devices.

Although a communication protocol suitable for implementing the present invention is TCP as described in the above exemplary embodiment, it is not limited to the TCP but may be of other communication protocol as long as it performs a congestion control.

Now, with regards to the exemplary embodiment described above, summarized main points of new technical contents are as follows.

Note that although, in the following, the technical contents of the above exemplary embodiment may be summarized as Supplementary Note 1 to Supplementary Note 18 as follows, the present invention is not necessarily limited thereto.

(Supplementary Note 1) <Claim 1>

A communication device comprising: a transmission data output unit for outputting a predetermined amount of communication data toward a communication destination via a network; and a transmission rate control unit for controlling a data amount continuously transmittable to the network by drive-controlling the transmission data output unit, wherein the transmission rate control unit comprises a transmission rate control function for controlling so as to keep continuously transmitting the transmission data in a range not exceeding an upper limit value of a specific transmission rate determined in advance.

(Supplementary Note 2) <Claim 2>

The communication device according to Supplementary Note 1, wherein the transmission rate control unit is provided with a transmission rate control mode specifying unit for specifying a transmission rate control mode based on congestion information of the network and a transmission rate calculation unit for determining an upper limit value of a transmission rate according to the specified transmission rate control mode and the transmission rate control unit comprises a function of controlling an output operation of the transmission data output unit based on respective output information of the transmission rate control mode specifying unit and the transmission rate calculation unit.

(Supplementary Note 3) <Claim 3>

The communication device according to Supplementary Note 2, wherein the transmission rate control mode specifying unit comprises a function of specifying the transmission rate control mode to any one of a rate surge mode for rapidly increasing the transmission rate, a rate adjustment mode for gradually increasing the transmission rate, and a rate suppression mode for suppressing the transmission rate based on congestion information of the network.

(Supplementary Note 4) <Claim 4>
The communication device according to Supplementary Note 3, wherein
the transmission rate control mode specifying unit comprises a control mode specifying function of specifying the transmission rate control mode depending on a signal propagation time in the network is short, normal, or long.

(Supplementary Note 5) <Claim 5>
The communication device according to Supplementary Note 2, wherein
the transmission rate control mode specifying unit comprises a function of specifying the transmission rate control mode to a rate surge mode for rapidly increasing the transmission rate when a signal propagation time at the current time becomes equal to or less than a minimum value of signal propagation times in the past.

(Supplementary Note 6) <Claim 6>
The communication device according to Supplementary Note 2, wherein
the transmission rate control mode specifying unit comprises a function of specifying the transmission rate control mode to a rate adjustment mode for gradually increasing the transmission rate when a signal propagation time at the current time becomes greater than a minimum value and less than a maximum value of signal propagation times in the past.

(Supplementary Note 7) <Claim 7>
The communication device according to Supplementary Note 2, wherein
the transmission rate control mode specifying unit comprises a function of specifying the transmission rate control mode to a rate suppression mode for suppressing the transmission rate when a signal propagation time at the current time becomes equal to or greater than a maximum value of signal propagation times in the past.

(Supplementary Note 8) <Claim 8>
The communication device according to Supplementary Note 1, wherein
the transmission rate control unit comprises a maximum rate transmission control function of continuing a transmission control of data at a maximum transmission rate in a range not exceeding a transmission rate upper limit value as long as a free space of a receive buffer size of a data receive unit provided in advance does not become zero.

(Supplementary Note 9) <Claim 9> (Invention of Method)
A transmission data output control method for
a communication device comprising: a transmission data output unit for outputting a predetermined amount of communication data toward a communication destination via a network; and a transmission rate control unit for controlling a data amount continuously transmittable to the network by drive-controlling the transmission data output unit, wherein
a transmission rate control mode specifying unit provided in advance specifies a transmission rate control mode required for transmitting the data based on congestion information obtained from the network,
a transmission rate calculation unit provided in advance determines an upper limit value of a transmission rate according to the specified transmission rate control mode, and
the transmission rate control unit drive-controls the transmission data output unit so as to keep continuously transmitting the transmission data in a range not exceeding the determined upper limit value of the transmission rate.

(Supplementary Note 10) <Corresponding to Claim 5>
The transmission data output control method according to Supplementary Note 9, wherein
in a step of specifying the transmission rate control mode, the transmission rate control mode specifying unit specifies the transmission rate control mode to a rate surge mode for rapidly increasing the transmission rate when a signal propagation time in the network at the current time becomes equal to or less than a minimum value of signal propagation times in the past.

(Supplementary Note 11) <Corresponding to Claim 6>
The transmission data output control method according to Supplementary Note 9, wherein
in a step of specifying the transmission rate control mode, the transmission rate control mode specifying unit specifies the transmission rate control mode to a rate adjustment mode for gradually increasing the transmission rate when a signal propagation time in the network at the current time becomes greater than a minimum value and less than a maximum value of signal propagation times in the past.

(Supplementary Note 12) <Corresponding to Claim 7>
The transmission data output control method according to Supplementary Note 9, wherein
in a step of specifying the transmission rate control mode, the transmission rate control mode specifying unit specifies the transmission rate control mode to a rate suppression mode for suppressing the transmission rate when a signal propagation time in the network at the current time becomes equal to or greater than a maximum value of signal propagation times in the past.

(Supplementary Note 13) <Corresponding to Claim 8>
The transmission data output control method according to Supplementary Note 9, wherein
in a step of drive-controlling the transmission data output unit, the transmission data control unit is configured to continue a transmission control of the data at a maximum transmission rate in a range not exceeding an upper limit value of the transmission rate as long as a free space of a receive buffer size of a data receive unit provided in advance does not become zero.

(Supplementary Note 14) (Program Invention/Corresponding to Supplementary Note 9)
A transmission data output control program for
a communication device comprising: a transmission data output unit for outputting a predetermined amount of communication data toward a communication destination via a network; and a transmission rate control unit for controlling a data amount continuously transmittable to the network by drive-controlling the transmission data output unit, wherein
a computer is caused to realize functions provided, the functions comprising:
a rate control mode specifying function for specifying a transmission rate control mode required for transmitting the data based on congestion information of the network;
a transmission rate upper limit value determination function for determining an upper limit value of a transmission rate according to the specified transmission rate control mode; and
an output unit drive-control function for drive-controlling the transmission data output unit so as to keep continuously transmitting the transmission data in a range not exceeding the determined upper limit value of the specified transmission rate.

(Supplementary Note 15)/Corresponding to Supplementary Note 10
The transmission data output control program according to Supplementary Note 14, wherein the rate control mode specifying function for specifying the transmission rate control mode is configured to comprise a function for specifying the transmission rate control mode to a rate surge mode for rapidly increasing the transmission rate when a signal propagation time in the network at the current time becomes equal to or less than a minimum value of signal propagation times in the past and the computer is caused to realize the specifying process function.

(Supplementary Note 16)/Corresponding to Supplementary Note 11

The transmission data output control program according to Supplementary Note 14, wherein the rate control mode specifying function for specifying the transmission rate control mode is configured to comprise a function for specifying the transmission rate control mode to a rate adjustment mode for gradually increasing the transmission rate when a signal propagation time in the network at the current time becomes greater than a minimum value and less than a maximum value of signal propagation times in the past and the computer is caused to realize the specifying process function.

(Supplementary Note 17)/Corresponding to Supplementary Note 12

The transmission data output control program, wherein the rate control mode specifying function for specifying the transmission rate control mode is configured to comprise a function for specifying the transmission rate control mode to a rate suppression mode for suppressing the transmission rate when a signal propagation time in the network at the current time becomes equal to or greater than a maximum value of signal propagation times in the past and the computer is caused to realize the specifying process function.

(Supplementary Note 18)/Corresponding to Supplementary Note 13

The transmission data output control program according to Supplementary Note 14, wherein the output unit drive-control function for drive-controlling the transmission data output unit is configured to comprise a function for continuing a transmission control of the transmission data at a maximum transmission rate in a range not exceeding an upper limit value of a transmission rate as long as a free space of a receive buffer size of a data receive unit provided in advance does not become zero and the computer is caused to realize the control function.

This application is based upon and claims the benefit of priority from Japanese patent application No. 2012-243363, filed on Nov. 5, 2012, the disclosure of which is incorporated herein in its entirety by reference.

INDUSTRIAL APPLICABILITY

The present invention may be applied to a communication terminal, a communication relay device, a communication server device, respective systems relating to a wired communication and a wireless communication, and the like.

RERFERENCE SIGNS LIST 1 communication device
2 counterpart communication device
10 network
11 transmission data output unit
12 network interface unit
13 data receive unit
13A receive buffer
14 RTT calculation unit
15 receive rate calculation unit
16 transmission rate control mode specifying unit
17 transmission rate calculation unit
18 transmission rate control unit
18A maximum rate transmission control function
19 data transmission unit

The invention claimed is:

1. A communication device comprising:
memory storing instructions; and
a processor configured to execute the instructions to:
specify a transmission rate control mode for transmitting data based on congestion information obtained from a network;
specify the transmission rate control mode to a rate surge mode for rapidly increasing a transmission rate when a signal propagation time in the network at a current time becomes equal to or less than a minimum value of signal propagation times in the past;
determine an upper limit value of the transmission rate based on the transmission rate control mode; and
drive-control a transmission data output so as to keep continuously transmitting transmission data in a range not exceeding the upper limit value of the transmission rate.

2. The communication device according to claim 1, wherein the processor is further configured to:
control the transmission data output based on the upper limit value and the transmission rate control mode.

3. The communication device according to claim 1, wherein the processor is further configured to specify
the transmission rate control mode depending on whether a signal propagation time in the network is short, normal, or long.

4. The communication device according to claim 1, wherein the processor is further configured to specify
the transmission rate control mode to a rate adjustment mode for gradually increasing the transmission rate when a signal propagation time at the current time becomes greater than a minimum value and less than a maximum value of signal propagation times in the past.

5. The communication device according to claim 2, wherein the processor is further configured to specify
the transmission rate control mode to a rate suppression mode for suppressing the transmission rate when a signal propagation time at the current time becomes equal to or greater than a maximum value of signal propagation times in the past.

6. The communication device according to claim 1, wherein processor is further configured to continue
a transmission control of data at a maximum transmission rate in a range not exceeding a transmission rate upper limit value as long as a free space of a receive buffer size of a data receive unit provided in advance does not become zero.

7. A transmission data output control method, comprising:
specifying a transmission rate control mode required for transmitting data based on congestion information obtained from a network and specifying the transmission rate control mode to a rate surge mode for rapidly increasing a transmission rate when a signal propagation time in the network at a current time becomes equal to or less than a minimum value of signal propagation times in the past;
determining an upper limit value of a transmission rate based on the specified transmission rate control mode; and drive-controlling transmission data output so as to keep continuously transmitting transmission data in a range not exceeding the upper limit value of the transmission rate.

8. A non-transitory computer-readable medium storing a transmission data output control program which causes a computer to carry out a process of:
   a rate control mode specifying function for specifying a transmission rate control mode required for data transmission based on congestion information of a network and specifying the transmission rate control mode to a rate surge mode for rapidly increasing a transmission rate when a signal propagation time in the network at a current time becomes equal to or less than a minimum value of signal propagation times in the past;
   a transmission rate upper limit value determination function for determining an upper limit value of the transmission rate based on the specified transmission rate control mode; and
   an output unit drive-control function for drive-controlling a transmission data output so as to keep continuously transmitting transmission data in a range not exceeding the upper limited value of the transmission rate.

9. The transmission data output control method according to claim 7, comprising:
   in a step of specifying the transmission rate control mode, specifying the transmission rate control mode to a rate adjustment mode for gradually increasing the transmission rate when a signal propagation time in the network at the current time becomes greater than a minimum value and less than a maximum value of signal propagation times in the past.

10. The transmission data output control method according to claim 7, comprising:
    in a step of specifying the transmission rate control mode, specifying the transmission rate control mode to a rate suppression mode for suppressing the transmission rate when a signal propagation time in the network at the current time becomes equal to or greater than a maximum value of signal propagation times in the past.

11. The transmission data output control method according to claim 7, comprising:
    in a step of drive-controlling the transmission data output, continuing a transmission control of the data at a maximum transmission rate in a range not exceeding an upper limit value of the transmission rate as long as a free space of a receive buffer size of a data receive unit provided in advance does not become zero.

12. The non-transitory computer-readable medium storing a transmission data output control program according to claim 8, wherein
    the rate control mode specifying function for specifying the transmission rate control mode is configured to comprise a function for specifying the transmission rate control mode to a rate adjustment mode for gradually increasing the transmission rate when a signal propagation time in the network at the current time becomes greater than a minimum value and less than a maximum value of signal propagation times in the past and
    the computer is caused to realize the specifying process function.

13. The non-transitory computer-readable medium storing a transmission data output control program according to claim 8, wherein
    the rate control mode specifying function for specifying the transmission rate control mode is configured to comprise a function for specifying the transmission rate control mode to a rate suppression mode for suppressing the transmission rate when a signal propagation time in the network at the current time becomes equal to or greater than a maximum value of signal propagation times in the past and
    the computer is caused to realize the specifying process function.

14. The non-transitory computer-readable medium storing a transmission data output control program according to claim 8, wherein
    the output unit drive-control function for drive-controlling the transmission data output unit is configured to comprise a function for continuing a transmission control of the transmission data at a maximum transmission rate in a range not exceeding an upper limit value of a transmission rate as long as a free space of a receive buffer size of a data receive unit provided in advance does not become zero and
    the computer is caused to realize the control function.

* * * * *